United States Patent [19]

Belter

[11] 4,126,318

[45] Nov. 21, 1978

[54] GASKET ASSEMBLY WITH LOCK PLATE

[75] Inventor: Jerome G. Belter, Mt. Prospect, Ill.

[73] Assignee: Dana Corporation, Toledo, Ohio

[21] Appl. No.: 821,456

[22] Filed: Aug. 4, 1977

[51] Int. Cl.² .............................................. F16J 15/06
[52] U.S. Cl. ..................................... 277/11; 277/183;
      277/189; 277/235 B
[58] Field of Search ....................... 277/9, 9.5, 10, 11,
      277/166, 178, 181–185, 188 R, 189, 193, 194,
      206 R, 235 B

[56] References Cited

U.S. PATENT DOCUMENTS

| 1,838,661 | 12/1931 | Cremean | 277/183 |
| 3,464,705 | 9/1969 | Ryan | 277/189 X |
| 3,560,007 | 2/1971 | Ascencio | 277/235 B |
| 3,565,449 | 2/1971 | Ascencio et al. | 277/235 B |
| 3,573,873 | 4/1971 | Pearson | 277/203 |
| 3,874,675 | 4/1974 | Belter et al. | 277/11 |
| 3,909,011 | 9/1975 | Sheesley | 277/11 |

FOREIGN PATENT DOCUMENTS 617,626  4/1961  Canada ..................................... 277/11

Primary Examiner—Robert S. Ward, Jr.
Attorney, Agent, or Firm—Robert M. Leonardi

[57] ABSTRACT

A gasket assembly includes a gasket which defines an aperture, and a gasket attachment, such as a gasket extension or a metering insert, secured to the gasket. The gasket attachment includes a base having a flange which is in contact with one side of the gasket adjacent the gasket aperture and a lock plate generally axially spaced from the base and in rotatable engagement therewith. The lock plate is adapted for rotation relative to the base from a first position wherein the lock plate is generally radially within the gasket aperture to a second position wherein the gasket is clamped between the lock plate and the base flange.

12 Claims, 7 Drawing Figures

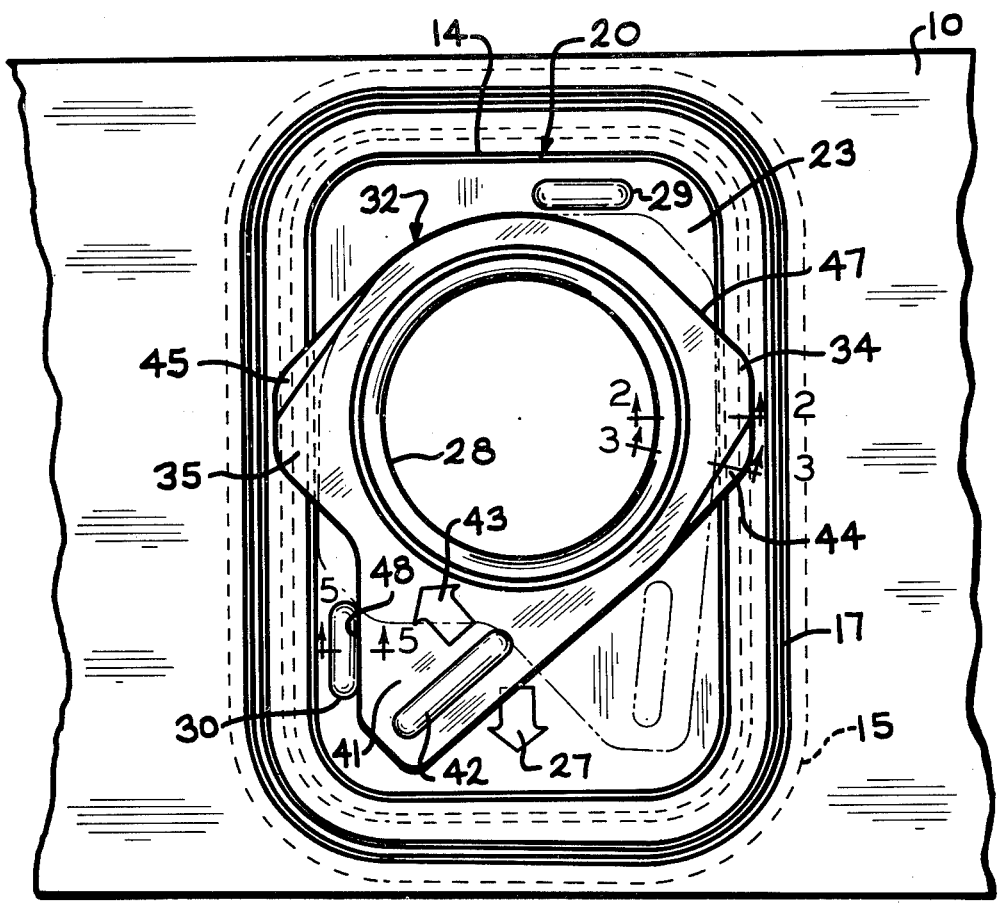

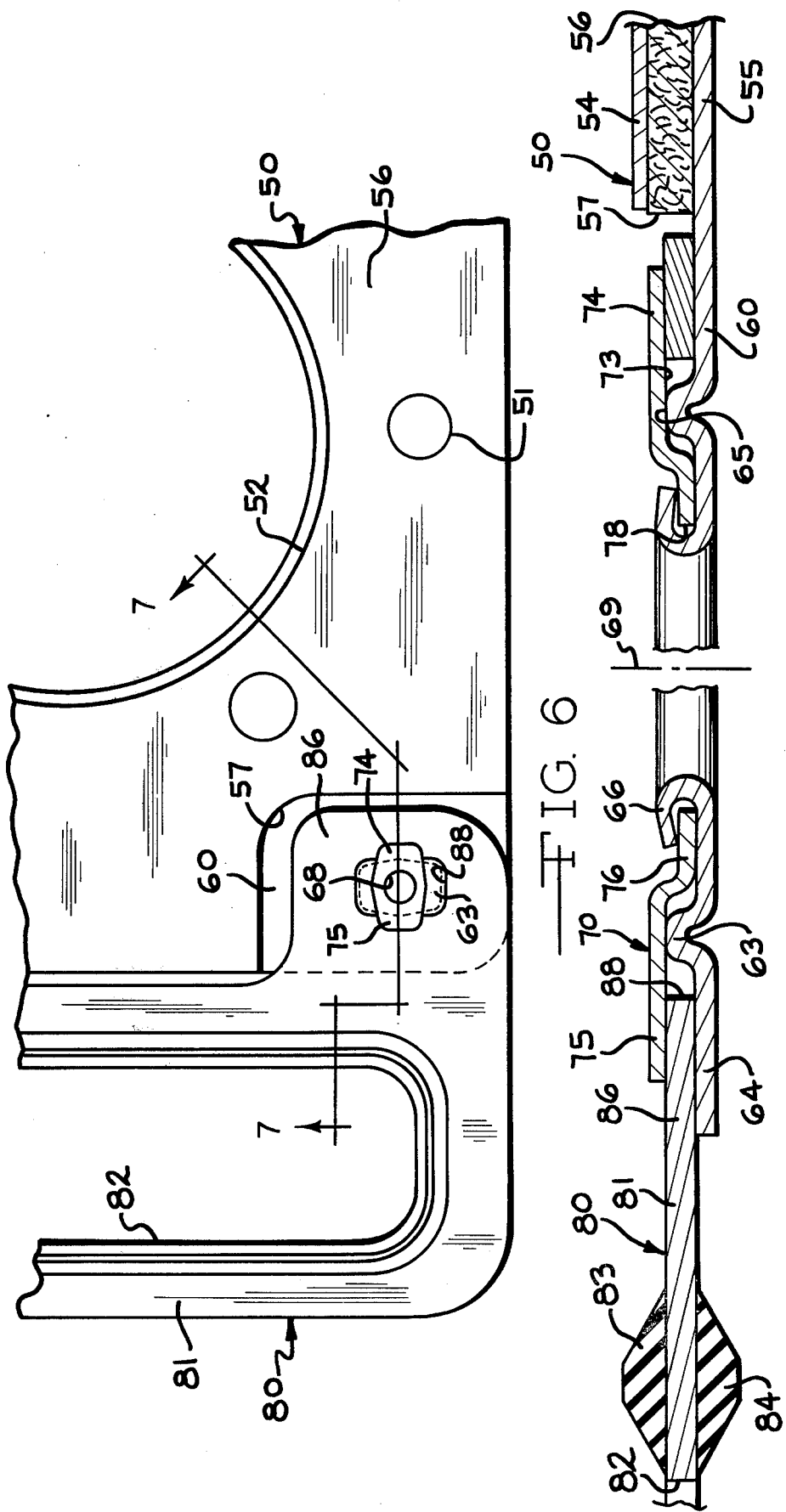

GASKET ASSEMBLY WITH LOCK PLATE

BACKGROUND OF THE INVENTION

This invention relates generally to gaskets and more particularly to gaskets having gasket attachments.

A single type of gasket can be adapted for several distinct applications by utilizing gasket attachments. These attachments may be used to fully or partially block openings in a basic gasket or to create additional sealing surfaces which extend therefrom. Gasket attachments have been utilized in the past to limit the number of types or styles of gaskets manufactured.

In the automobile and truck industry, for instance, engines are often interchangeably used in different styles or models of vehicles. However, it is often necessary to use engine gaskets having different aperture patterns or additional sealing surfaces in different vehicles.

As an example, in certain automobile engine/vehicle combinations, the engine manifold gaskets are supplied with a metering attachment, which totally or partially blocks a fuel preheating aperture, as is well known in the art. As another example, engine manifold gaskets may be enlarged for sealing additional apertures in an engine for which it is not specifically designed.

Heretofore, gasket manufacturers have adapted basic gaskets for use in several different applications by utilizing gasket attachments. However, manufacturers hav used their specialized equipment to unremovably affix gasket attachments to these basic gaskets.

Difficulties have occured in servicing engines having gasket attachments. Engine servicers are required to stock several gaskets of the same basic design but having different attachments. Keeping a full stock of all combinations of gaskets and attachments has become increasingly difficult with the increasing number of gasket/attachment combinations available today. Field assembly of gaskets and gasket attachments by an engine servicer has heretofore been impossible because such servicers do not possess the tools nor the capabilities required to "manufacture" gaskets. The unconventional tools required for this operation have proven too difficult for use in a field setting.

SUMMARY OF THE INVENTION

It is an object of the present invention to provide a gasket assembly which can easily be assembled without the use of specialized tools.

This and other objects of the present invention which will become apparent from the following detailed description are achieved by a gasket assembly comprising a gasket which defines an aperture and a gasket attachment having a base for engagement with one side of the gasket adjacent the gasket aperture. The gasket attachment further comprises a lock plate operatively engaged with the base and having a flange adapted for engagement with another side of the gasket adjacent the gasket aperture. The lock plate is adapted for movement from a first position wherein the lock plate flange is generally radially within the gasket aperture to a second position wherein the lock plate flange is engaged with the gasket.

BRIEF DESCRIPTION OF THE DRAWINGS

FIG. 1 is a top view of a gasket assembly of the present invention. The gasket assembly is shown in an unsecured or open position in phantom.

FIG. 2 is a cross sectional side view of the gasket assembly of FIG. 1 taken through line 2—2.

FIG. 3 is a cross sectional side view of the gasket assembly of FIG. 1 taken through line 3—3.

FIG. 4 is a cross sectional side view of the gasket assembly of the present invention in an unsecured or open position.

FIG. 5 is a cross sectional side view of the gasket assembly of FIG. 1 taken through line 5—5.

FIG. 6 is a top view of an alternative embodiment of the gasket assembly of the present invention. The gasket attachment is shown in an unsecured position in phantom.

FIG. 7 is an enlarged cross sectional side view of the gasket assembly of FIG. 6 taken through line 7—7.

DETAILED DESCRIPTION OF A PRESENTLY PREFERRED EMBODIMENT

FIG. 1 shows a gasket 10 for use in automobile or truck engine comprising an exhaust gas circulation port 14 having an axis (not shown) extending therethrough. The gasket is adaptable for use in several different types of vehicles and the exhaust gas circulation port 14 may be adapted accordingly. The gasket 10 is a "hard" gasket, having a rigid gasket plate 12. The gasket plate 12 contains numerous perforations 13 for securing gasket material such as asbestos or rubber asbestos composition 16 to either side thereof. The gasket 10 has a total thickness of about 0.070 inches (1.76 mm.). As seen in FIG. 4 an embossed ridge or "bead" 15, formed by stamping a channel 17 into the gasket 10, as is well known in the art, extends continuously around the gasket aperture 14. The bead 15 increases the sealing stress around the aperture 14 and therefore aids in sealing the gasket 10 between opposing engine parts (not shown).

A gasket insert attachment 20 is positioned generally within the gas circulation aperture 14. As more clearly seen in FIG. 2, the attachment 20 includes a stationary base 22 having a boss 23 extending generally axially within the aperture 14. The boss 23 has a flat and generally radially extending surface 25 and an outer periphery of a size and configuration similar to that of the aperture 14 such that the boss 23 fits snugly therein. The base 22 further comprises a flange 24 extending generally radially outwardly from the boss 23. The flange 24 is adapted for continuous peripheral engagement with one side of the gasket 10 adjacent to gasket aperture 14. The flange 24 engages the gasket 10 on the same side as the bead 15, but the bead 15 is radially outwardly spaced from the aperture 14 such that it is not in engagement with the flange 24.

In this presently preferred embodiment the gasket insert attachment 20 has a reduced aperture 28 and the attachment therefore partially blocks the exhaust gas aperture 14. The base 22 comprises a circular, radially inner flange 26 which is bent in a "U" configuration and which defines the reduced aperture 28. The base 22 can be formed in a one step stamping operation which provides all the required bosses, apertures and flanges.

The gasket insert attachment 20 further comprises a lock plate 32 rotatable relative to the base 22. Preferably the base 22 and the lock plate 32 are formed of stainless steel having a thickness of about 0.008 inches (0.2 mm). The lock plate 32, which can be formed in a stamping operation similar to that in which the base is manufactured, includes a flat and generally radially extending surface 33 adapted for contact with the boss surface 25, and flange 36 which defines an aperture 38. The lock plate flange 36 is adapted to be rotatably secured within the U-shaped base flange 26. Prior to assembly of the insert attachment 20, the base flange 26 has an "L" configuration, i.e., it extends generally axially relative to the aperture 28, or upwardly as viewed in FIG. 2. In assembling the attachment 20, the lock plate flange 36 is fitted over the L-shaped base flange 26 and the flange 26 is bent into its U-shape, therefore rotatably securing in the lock plate 32.

The lock plate 32 further comprises two generally radially outwardly extending gasket clamping flanges 34 and 35. The flanges 34 and 35 are circumferentially spaced approximately 180° about the lock plate aperture 38 and are adapted to clampingly engage circumferentially opposite sides of the associated gasket as will hereinafter be described. As can be seen in FIG. 1 and 3, each flange 34 and 35 comprises a generally triangularly shaped and axially flared portion 44 and 45, respectively. The portions 44 and 45 are axially flared a distance "x" (see FIG. 3) of from about 0.008 to 0.015 inches (0.2 to 0.4 mm) to permit easy rotation of the insert attachment as will be described herein.

The base 22 further comprises stops 29 and 30 (see FIGS. 1 and 5). The stops 29 and 30 can readily be stamped into the base 22 in the manufacturing process. The stop 29 extends generally horizontally as viewed in FIG. 1 and is adapted to engage a straight edge 47 of the lock plate 32 when the lock plate is in a fully open position (as seen in FIG. 1 in phantom). The stop 30 extends generally vertically as viewed in FIG. 1 (i.e., perpendicular to the stop 29) and is adapted to buttingly engage a straight edge 48 of the lock plate 32 when the lock plate is in a closed or gasket clamping position as is seen in FIGS. 1 and 5. The edges 47 and 48 extend at a 45° angle to each other, and the stops 29 and 30 therefore prevent rotation of the lock plate 32 outside of a preferred 45° range.

The lock plate 32 further includes a handle portion 41 which comprises a gripping means 42 for rotation of the lock plate. The gripping means 42, similar to the stops 29 and 30, is a ridge or boss which may be provided in the same stamping operation in which the lock plate 32 is formed.

For a more thorough understanding of the present invention the method of installation of the insert assembly is set forth. When the engine of a vehicle such as a passenger car or truck has been dismantled for repair, a new set of gaskets, including a manifold gasket, is usually required. Utilizing the present invention, field maintenance can more easily be accomplished due to the availability interchangeability of parts. The repair or maintenance personnel will have readily available a main gasket body 10 adaptable for use in the particular engine. A determination is then made whether any gasket attachment is required. If, for example, a manufacturer's specifications require a gasket insert assembly having a partially blocked exhaust gas circulation port, an insert attachment such as 20 can be installed in the field.

The insert attachment base 22 includes a stamped arrow 27 pointing generally downwardly as viewed in FIG. 1. This arrow 27 provides means for indicating the orientation of the gasket insert attachment relative to the gasket. To facilitate installation, the manufacturer furnishes the insert attachment 20 to the user with the lock plate 32 oriented to its open position (as viewed in FIG. 1 in phantom). In this position the flat surface 47 abutts the stop means 29. It can be seen in phantom in FIG. 1 that the gasket engaging flanges 34 and 35 are completely radially within the gasket aperture 14. It is therefore possible to insert the boss 23 of the gasket insert attachment axially into the gasket aperture 14 such that the base flange 24 is in full circumferential contact with the gasket adjacent the periphery of the aperture 14.

When the gasket insert attachment is within the gasket aperture 14 the lock plate 32 is rotated clockwise as viewed in FIG. 1. The handle portion 41 comprises a stamped arrow 43 indicating the direction of rotation for locking the insert attachment 20. As rotation of the lock plate 32 begins from an open position (shown in Phantom in FIG. 1) to a closed position, the periphery of the gasket adjacent aperture 14 will firstly be engaged by the two flared portions 44 and 45 of the rotatable member flanges, 34 and 35 respectively. As can be seen in FIG. 3, the axial distance between the flared portions 44 and 45 and the flange 24 of the base flange 24 is greater than the thickness of the gasket 10. The flared portions 44 and 45 therefore eliminate any digging into the gasket that may otherwise occur because the gasket thickness is greater than the axial distance between the clamping or non-flared portions of the flanges 34 and 35 and the base flange 24 (see FIG. 4). As the lock plate 32 is rotated further the main portions of the flanges 34 and 35 come into clamping engagement with the gasket 10. After rotation of the lock plate 32 an angle of 45° relative to the base the flat surface 48 of the handle 41 abutts or stops against the base stop means 30 and the gasket 10 is fully clampingly engaged between the flanges 34 and 35 and the associated portion of the base flange 24. The gasket 10, including the insert attachment 20, is now ready for installation in the appropriate engine.

Referring to FIGS. 6 and 7, an alternative embodiment of the present invention is set forth. A head gasket 50 for a heavy duty engine as a truck engine is comprised of a heat resistant material such as asbestos 56 sandwiched between a top and a bottom layer 54 and 55, respectively, of rigid sheet material such as steel. The gasket 50 includes a plurality of cylinder apertures 52 and bolt holes 51.

The gasket 50 is adapted to receive a gasket attachment such as 80. A corner of the top gasket plate 54 and the asbestos layer 56 is broken away, forming an edge 57 which defines a gasket attachment base 60 in the bottom gasket plate 56. The base 60 is provided with an aperture 68 having an axis 69. The aperture 68 is defined by a "U" shaped flange 66. A boss 63 projects upwardly as viewed in FIG. 7 and surrounds the aperture 68. A base flange 64 extends generally radially outwardly from the boss 63 and is adapted for contact with a portion of the gasket attachment 80.

A lock plate 70 is rotatably secured to the gasket 50 at the base 60. The lock plate 70 has a flat and generally radially extending surface 73 adapted for contact with another flat and general radially extending surface 65 of the boss 63. The lock plate 70 includes two generally radially extending lock flanges 74 and 75 which are circumferentially spaced approximately 180°. The lock plate 70 further includes an annular flange 76 defining a lock plate aperture 78. The lock plate flange 76 is fitted within the "U" shaped base flange 66, the lock plate 70 thereby being rotatably secured to the base 60.

The gasket attachment 80 includes a rigid metal plate 81 which defines an aperture 82 for liquid coolant or the like. The attachment 80 may be required in specific engines in which the gasket 50 is utilized. Top and bottom elastomeric sealing devices 83 and 84, respectively, extend continuously adjacent the periphery of the aperture 82.

The gasket attachment 80 includes a generally rectangular extension 86 positioned adjacent the base area 60 of the gasket 50. The attachment extension 86 includes a generally rectangular locking aperture 88. The aperture 88 is of sufficient size to fit over the boss 63, such that the boss extends generally axially within the aperture 88. The aperture 88 is also of sufficient size to permit the lock plate 70 to be generally radially within the aperture 88 when the lock plate 70 is properly positioned.

For a field assembly of the gasket attachment 80 to the gasket 50, the lock plate 70 is rotated into a generally vertical position as shown in phantom in FIG. 6. The attachment extension 86 is placed over the base 60, with the aperture 88 dropping downwardly over the lock plate flanges 74 and 75 and the boss 63. The lock plate 70 is then rotated either clockwise or counterclockwise 90° into a second position as shown in FIG. 6 wherein the flanges 74 and 75 clampingly engage the attachment plate 81, thereby securing it between the flanges and the base 60. The gasket 50 may also be provided with additional bases and lock plates, at an opposite corner for example, to more firmly secure the gasket attachment 80.

The present invention permits an automobile engine servicer to stock basic gaskets plus a supply of the various gasket attachments and to field assemble numerous combinations of gasket assemblies without the use of specialized tools or equipment. This invention also assures that such gasket field assembly can be easily and quickly accomplished without handling more than two gasket components and with the assurance that the assembly will be as adequate as factory produced gasket assemblies.

Although the foregoing structures have been described for the purpose of illustrating presently preferred embodiments of the invention, it should be understood that many modifications or alterations may be made without departing from the spirit and scope of the invention as set forth in the appended claims. It should also be noted that the terms "gasket" and "gasket attachment" may be used interchangeably in this specification and in the appended claims.

I claim:

1. A gasket assembly having a gasket defining an aperture, said gasket aperture having an axis extending therethrough, and a gasket attachment comprising a base having a portion for engagement with said gasket adjacent said gasket aperture, and a lock plate having a portion movable relative to said base from a first position generally radially within said gasket aperture to a second position for engagement with another side of said first gasket adjacent said gasket aperture.

2. A gasket assembly as defined in claim 1 wherein said base comprises a boss extending generally axially into said gasket aperture.

3. A gasket assembly as defined in claim 2 wherein said boss comprises a generally flat and radially extending surface, and wherein said lock plate comprises a generally flat and radially extending surface axially abutting said boss surface.

4. A gasket assembly as defined in claim 1 wherein said base comprises an annular flange defining an aperture generally smaller than said gasket aperture.

5. A gasket assembly as defined in claim 4 wherein said lock plate defines an aperture and wherein said lock plate is rotatably affixed to said base by said annular base flange.

6. A gasket assembly as defined in claim 5 wherein said base further comprises means for limiting rotation of said lock plate relative to said base.

7. A gasket assembly as defined in claim 6 wherein said gasket attachment comprises means for indicating a direction of rotation of said lock plate from said first position to said second position.

8. A gasket as defined in claim 1 wherein said lock plate is rotatably engaged with said base and wherein said lock plate is rotatable from said first position to said second position.

9. A gasket assembly as defined in claim 8 wherein said lock plate portion comprises a generally radially extending lock flange, wherein said gasket is clampingly received between said lock flange and said base when said lock plate is in said second position.

10. A gasket assembly as defined in claim 8 wherein said generally radially extending lock plate flange comprises a generally axially flared portion, wherein the axial distance between said base and said axially flared portion is greater than the thickness of said gasket.

11. A gasket assembly as defined in claim 10 wherein said lock plate comprises another generally radially extending flange clampingly engageable with said first gasket member, said another flange circumferentially spaced about 180° around said lock plate from said lock plate flange.

12. A gasket assembly as defined in claim 5 wherein said base portion comprises a generally radially extending flange abutting said gasket continuously around said gasket aperture.

* * * * *